US011062509B2

(12) United States Patent
Bell et al.

(10) Patent No.: US 11,062,509 B2
(45) Date of Patent: Jul. 13, 2021

(54) MULTI-MODAL METHOD FOR INTERACTING WITH 3D MODELS

(71) Applicant: Matterport, Inc., Sunnyvale, CA (US)

(72) Inventors: Matthew Bell, Palo Alto, CA (US); Michael Beebe, San Carlos, CA (US)

(73) Assignee: Matterport, Inc., Sunnyvale, CA (US)

( * ) Notice: Subject to any disclaimer, the term of this patent is extended or adjusted under 35 U.S.C. 154(b) by 0 days.

(21) Appl. No.: 16/386,910

(22) Filed: Apr. 17, 2019

(65) Prior Publication Data

US 2019/0244419 A1    Aug. 8, 2019

Related U.S. Application Data

(63) Continuation of application No. 15/722,269, filed on Oct. 2, 2017, now Pat. No. 10,304,240, which is a continuation of application No. 13/925,772, filed on Jun. 24, 2013, now Pat. No. 9,786,097.

(60) Provisional application No. 61/663,265, filed on Jun. 22, 2012.

(51) Int. Cl.
*G06T 19/00* (2011.01)
*G06T 17/00* (2006.01)

(52) U.S. Cl.
CPC ............ *G06T 17/00* (2013.01); *G06T 19/003* (2013.01); *G06T 2210/04* (2013.01)

(58) Field of Classification Search
CPC .................................................. G06T 19/003
See application file for complete search history.

(56) References Cited

U.S. PATENT DOCUMENTS

| 4,578,757 A | 3/1986 | Strark |
| 5,276,785 A | 1/1994 | Mackinlay et al. |
| 5,552,806 A | 9/1996 | Lenchik |
| 5,611,025 A | 3/1997 | Lorensen et al. |
| 5,671,381 A * | 9/1997 | Strasnick ............ G06F 3/04815 345/426 |
| 5,734,884 A | 3/1998 | Eberhard et al. |
| 6,130,670 A | 10/2000 | Porter |
| 6,346,938 B1 * | 2/2002 | Chan ................... G06F 3/04815 345/419 |
| 6,525,731 B1 | 2/2003 | Suits et al. |
| 6,907,579 B2 | 6/2005 | Chang |
| 7,242,408 B1 * | 7/2007 | Dunn ...................... G06T 15/04 345/426 |
| 7,933,395 B1 | 4/2011 | Bailly |
| 8,200,594 B1 | 6/2012 | Bleiweiss |
| 8,339,394 B1 | 12/2012 | Lininger |
| 8,902,288 B1 | 12/2014 | Fan et al. |

(Continued)

OTHER PUBLICATIONS

Fitzmaurice et al., "Safe 3D Navigation", 2008, I3D '08: Proceedings of the 2008 symposium on Interactive 3D graphics and games, Feb. 2008, pp. 7-15 (Year: 2008).*

(Continued)

*Primary Examiner* — Phong X Nguyen
(74) *Attorney, Agent, or Firm* — Ahmann Kloke LLP

(57) ABSTRACT

The present disclosure concerns a methodology that allows a user to "orbit" around a model on a specific axis of rotation and view an orthographic floor plan of the model. A user may view and "walk through" the model while staying at a specific height above the ground with smooth transitions between orbiting, floor plan, and walking modes.

20 Claims, 3 Drawing Sheets

(56) References Cited

U.S. PATENT DOCUMENTS

| | | | |
|---|---|---|---|
| 9,046,996 B2 | 6/2015 | Gallup | |
| 9,179,252 B1 | 11/2015 | Liu et al. | |
| 9,244,940 B1 | 1/2016 | Donsbach et al. | |
| 9,437,045 B2 | 9/2016 | Arendash | |
| 9,671,938 B2 | 6/2017 | Seitz et al. | |
| 2002/0113865 A1 | 8/2002 | Yano | |
| 2002/0140698 A1* | 10/2002 | Robertson | G06T 15/20 345/427 |
| 2003/0052877 A1 | 3/2003 | Schwegler, Jr. et al. | |
| 2004/0041812 A1* | 3/2004 | Roberts | G06F 30/13 345/474 |
| 2004/0046760 A1* | 3/2004 | Roberts | G06T 19/003 345/474 |
| 2005/0151751 A1 | 7/2005 | Hong et al. | |
| 2006/0004512 A1 | 1/2006 | Herbst | |
| 2006/0066612 A1 | 3/2006 | Yang et al. | |
| 2006/0114251 A1 | 6/2006 | Miller | |
| 2006/0132482 A1 | 6/2006 | Oh | |
| 2006/0176297 A1 | 8/2006 | Kim | |
| 2006/0227134 A1* | 10/2006 | Khan | G06T 19/003 345/420 |
| 2007/0024612 A1 | 2/2007 | Balfour | |
| 2007/0110338 A1 | 5/2007 | Snavely et al. | |
| 2007/0171221 A1 | 7/2007 | Miyamoto et al. | |
| 2007/0203545 A1* | 8/2007 | Stone | G16H 50/50 607/59 |
| 2008/0024484 A1 | 1/2008 | Naimark | |
| 2008/0028341 A1 | 1/2008 | Szeliski et al. | |
| 2008/0088621 A1* | 4/2008 | Grimaud | G06T 19/00 345/421 |
| 2008/0106594 A1 | 5/2008 | Thrun | |
| 2008/0143727 A1 | 6/2008 | Oh et al. | |
| 2008/0247636 A1 | 10/2008 | Davis et al. | |
| 2008/0291217 A1 | 11/2008 | Vincent et al. | |
| 2009/0005981 A1 | 1/2009 | Forstall et al. | |
| 2009/0079732 A1* | 3/2009 | Fitzmaurice | G06F 3/04815 345/419 |
| 2009/0129690 A1 | 5/2009 | Marcellin et al. | |
| 2009/0274391 A1 | 11/2009 | Arcas et al. | |
| 2009/0281728 A1 | 11/2009 | Mishra et al. | |
| 2009/0289937 A1* | 11/2009 | Flake | G01C 21/3635 345/419 |
| 2010/0045666 A1* | 2/2010 | Kornmann | G06F 3/04815 345/419 |
| 2010/0045678 A1 | 2/2010 | Reid | |
| 2010/0077311 A1 | 3/2010 | Santoro et al. | |
| 2010/0087257 A1 | 4/2010 | Deb | |
| 2010/0171741 A1 | 7/2010 | Brill et al. | |
| 2010/0182400 A1 | 7/2010 | Nelson et al. | |
| 2010/0188503 A1 | 7/2010 | Tsai et al. | |
| 2010/0201684 A1 | 8/2010 | Yadav et al. | |
| 2010/0214284 A1 | 8/2010 | Rieffel et al. | |
| 2010/0265248 A1* | 10/2010 | McCrae | G06F 3/04815 345/419 |
| 2010/0268457 A1 | 10/2010 | Mccrae et al. | |
| 2010/0315416 A1 | 12/2010 | Pretlove | |
| 2011/0007962 A1 | 1/2011 | Johnson et al. | |
| 2011/0010650 A1 | 1/2011 | Hess et al. | |
| 2011/0187723 A1* | 8/2011 | Chen | G06T 7/97 345/473 |
| 2011/0199302 A1 | 8/2011 | Tossell et al. | |
| 2011/0249757 A1 | 10/2011 | Newton et al. | |
| 2011/0283223 A1 | 11/2011 | Vaittinen et al. | |
| 2011/0310087 A1 | 12/2011 | Wright, Jr. et al. | |
| 2011/0310088 A1 | 12/2011 | Adabala et al. | |
| 2011/0316976 A1 | 12/2011 | Nakajima et al. | |
| 2011/0320116 A1 | 12/2011 | Demaio et al. | |
| 2012/0019522 A1 | 1/2012 | Awrence et al. | |
| 2012/0030630 A1* | 2/2012 | Grossman | G06F 3/04845 715/850 |
| 2012/0044247 A1 | 2/2012 | Naimark | |
| 2012/0050288 A1* | 3/2012 | Crucs | G06T 15/08 345/422 |
| 2012/0116728 A1 | 5/2012 | Shear et al. | |
| 2012/0127169 A1 | 5/2012 | Barcay et al. | |
| 2012/0127170 A1* | 5/2012 | Varadhan | G06T 19/00 345/419 |
| 2012/0133640 A1 | 5/2012 | Thin et al. | |
| 2012/0139915 A1 | 6/2012 | Muikaichi et al. | |
| 2012/0155744 A1 | 6/2012 | Kennedy et al. | |
| 2012/0209574 A1* | 8/2012 | Moreau | G06F 30/13 703/1 |
| 2012/0316441 A1 | 12/2012 | Toma et al. | |
| 2012/0327184 A1 | 12/2012 | Zhu et al. | |
| 2013/0009954 A1 | 1/2013 | Ofek et al. | |
| 2013/0016896 A1 | 1/2013 | Seida | |
| 2013/0044139 A1* | 2/2013 | Hernandez Esteban | G06T 19/003 345/676 |
| 2013/0085823 A1 | 4/2013 | Gibson | |
| 2013/0179841 A1 | 7/2013 | Mutton et al. | |
| 2013/0187952 A1 | 7/2013 | Berkovich et al. | |
| 2013/0207963 A1 | 8/2013 | Stirbu et al. | |
| 2013/0271457 A1 | 10/2013 | Haswell | |
| 2013/0271462 A1* | 10/2013 | Frank | G06T 17/00 345/420 |
| 2013/0300656 A1 | 11/2013 | Roegelein et al. | |
| 2013/0321392 A1 | 12/2013 | van der Merwe et al. | |
| 2013/0321397 A1 | 12/2013 | Chen et al. | |
| 2013/0321401 A1* | 12/2013 | Piemonte | G06T 19/20 345/419 |
| 2014/0002439 A1 | 1/2014 | Lynch | |
| 2014/0002440 A1 | 1/2014 | Lynch | |
| 2014/0062998 A1 | 3/2014 | Ofstad et al. | |
| 2014/0095122 A1 | 4/2014 | Appleman | |
| 2014/0104280 A1 | 4/2014 | Ofstad et al. | |
| 2014/0218360 A1 | 8/2014 | Dalgaard Larsen | |
| 2014/0240318 A1 | 8/2014 | Coombe et al. | |
| 2014/0253541 A1 | 9/2014 | Schmidt | |
| 2014/0314322 A1 | 10/2014 | Snavely et al. | |
| 2014/0320484 A1 | 10/2014 | Rane | |
| 2015/0009327 A1 | 1/2015 | Love | |
| 2015/0085068 A1 | 3/2015 | Becker | |
| 2015/0130894 A1 | 5/2015 | Holzer | |
| 2015/0269785 A1 | 9/2015 | Bell et al. | |
| 2015/0293354 A1 | 10/2015 | Oishi | |
| 2016/0127690 A1 | 5/2016 | Kaehler et al. | |
| 2016/0210788 A1 | 7/2016 | Kasahara | |
| 2016/0267067 A1 | 9/2016 | Mays et al. | |
| 2016/0328373 A1 | 11/2016 | Rhoades et al. | |
| 2017/0352196 A1 | 12/2017 | Chen et al. | |

OTHER PUBLICATIONS

Yan et al., "Integrating BIM and gaming for real-time interactive architectural visualization", 2011, Automation in Construction 20 (2011), pp. 446-458 (Year: 2011).*

Geraerts, "Camera Planning in Virtual Environments Using the Corridor Map Method", 2009), MIG 2009, LNCS 5884, pp. 194-206 (Year: 2009).*

Non-Final Office Action for U.S. Appl. No. 16/155,151 dated Oct. 31, 2019, 18 pages.

Non-Final Office Action for U.S. Appl. No. 16/162,683 dated Dec. 30, 2019, 18 pages.

Final Office Action for U.S. Appl. No. 16/155,151 dated May 4, 2020, 19 pages.

Notice of Allowance for U.S. Appl. No. 16/162,683 dated May 14, 2020, 20 pages.

Notice of Allowance for U.S. Appl. No. 16/155,151 dated Oct. 1, 2020, 13 pages.

International Search Report & Written Opinion for International Patent Application Serial No. PCT/US2015/020453, dated Jun. 25, 2015, 11 pages.

Non-Final Office Action from U.S. Appl. No. 14/219,906, dated Nov. 18, 2015, 29 pages.

Final Office Action from U.S. Appl. No. 14/219,906, dated Jun. 21, 2016, 35 pages.

Non-Final Office Action for U.S. Appl. No. 13/925,772 dated Nov. 28, 2014, 10 pages.

(56) References Cited

OTHER PUBLICATIONS

Final Office Action for U.S. Appl. No. 13/925,772 dated May 5, 2015, 31 pages.
Non-Final Office Action for U.S. Appl. No. 13/925,772 dated Feb. 3, 2016, 37 pages.
European Office Action from EP Application Serial No. 15764342.0, dated Oct. 28, 2016, 2 pages.
Final Office Action for U.S. Appl. No. 13/925,772 dated Aug. 16, 2016, 41 pages.
Bourke, "Interpolation methods", URL: http://paulbourke.net/miscelianeous/interpolation/, Dec. 1999, pp. 1-14.
Wien, Tu, "Computer-Assisted Animation", URL: https://www.cg.tuwien.ac.at/courses/Animation/B_Computer_Assisted_Animation.pdf, 2002, pp. 1-20.
Hsieh et al., "Photo Navigator", MM '08 Proceedings of the 16th ACM international conference on Multimedia, 2008, pp. 419-428.
Non-Final Office Action for U.S. Appl. No. 14/219,906, dated Mar. 2, 2017, 40 pages.
Notice of Allowance for U.S. Appl. No. 13/925,772, dated Jun. 1, 2017, 32 pages.
Final Office Action for U.S. Appl. No. 14/219,906 dated Oct. 19, 2017, 43 pages.
Non-Final Office Action from U.S. Appl. No. 15/199,853, dated Oct. 31, 2017, 31 pages.
Extended European Search Report Issued in EP Patent application No. 15764342.0 dated Aug. 11, 2017, 9 pages.
WilloxH: "Microsoft Photosynth", URL: https://www.youtube.com;watch?v=p16frKJLVi0, Jul. 27, 2006, 1 page.
Non-Final Office Action for U.S. Appl. No. 14/219,906 dated Apr. 4, 2018, 22 pages.
Non-Final Office Action for U.S. Appl. No. 15/272,337 dated Feb. 2, 2018, 66 pages.
Final Office Action from U.S. Appl. No. 15/199,853, dated Apr. 25, 2018, 31 pages.
Notice of Allowance received for U.S. Appl. No. 14/219,906 dated Jul. 10, 2018, 55 pages.
Snavely et al., "Photo Tourism: Exploring Photo Collections in 3D", SIGGRAPH '06 ACM SIGGRAPH, 2006, pp. 835-846.
Notice of Allowance received for U.S. Appl. No. 15/272,337 dated Jul. 17, 2018, 46 pages.
Non-Final Office Action received for U.S. Appl. No. 15/722,269 dated Oct. 17, 2018, 55 pages.
Notice of Allowance received for U.S. Appl. No. 15/722,269 dated Jan. 29, 2019, 24 pages.

\* cited by examiner ial (3D) modeling. More specifically, the present invention relates to a methodology that allows a user to "orbit"

MULTI-MODAL METHOD FOR INTERACTING WITH 3D MODELS

CROSS-REFERENCE TO RELATED APPLICATIONS

This application is a continuation of U.S. patent application Ser. No. 15/722,269, filed on Oct. 2, 2017, entitled "MULTI-MODAL METHOD FOR INTERACTING WITH 3D MODELS", and now issued as U.S. Pat. No. 10,304,240 which is a continuation of U.S. patent application Ser. No. 13/925,772, filed on Jun. 24, 2013, entitled "MULTI-MODAL METHOD FOR INTERACTING WITH 3D MODELS", and now issued as U.S. Pat. No. 9,786,097, which claims the benefit of U.S. Provisional Application No. 61/663,265 filed Jun. 22, 2012, entitled "WEB PLAYER FOR VIEWING MODELS". The entireties of the aforementioned applications are hereby incorporated herein by reference.

BACKGROUND

Field of the Invention

The present invention generally related to three-dimensional (3D) modeling. More specifically, the present invention relates to a methodology that allows a user to "orbit" around a model on a specific axis of rotation and view an orthographic floor plan of the model. The present invention further allows a user to view and "walk through" the model while staying at a specific height above the ground with smooth transitions between orbiting, floor plan, and walking modes.

Description of the Related Art

There has been extensive work in the field of interactive, first-person 3D immersive environments in which users are able to walk through a virtual space. The last quarter-century of first-person shooter video games are evidence of and otherwise exemplary of the same.

Complementing and expanding upon this work are various tools for visualizing 3D models of terrain. Aerial modeling tools such as Google Earth allow users to virtually explore urban areas in 3D from an aerial point of view. Panoramic modeling tools such as Google Street View allow users to view multiple 360-degree panoramas of an environment and to navigate between these multiple panoramas with a visually blended interpolation. Finally, there exist a more generally applicable variety of 3D modeling tools such as Maya® 3D animation software and 3ds Max® software that allow users to view 3D models in an object-centric manner whereby a user may zoom in and out on the model and rotate the same around a desired central point.

It is also becoming more feasible to automatically capture real-world spaces in 3D. These captured spaces may then be converted into 3D models. Exemplary tools for such capture include laser scanners, coordinate measuring technologies, and various software suites from FARO Technologies and the 3D capture system from Matterport.

With these developments, there is a consequential need to view and navigate these 3D models on an array of computing devices.

SUMMARY OF THE PRESENTLY CLAIMED INVENTION

A first claimed embodiment encompasses a system for three-dimensional modeling. The system includes an input device that receives user interactions, a storage device, and an output device. The storage device includes instructions that are executable by a processor to generate, manipulate, or update three-dimensional modeling data. The output device displays the three-dimensional modeling data.

DETAILED DESCRIPTION

Figure 1:
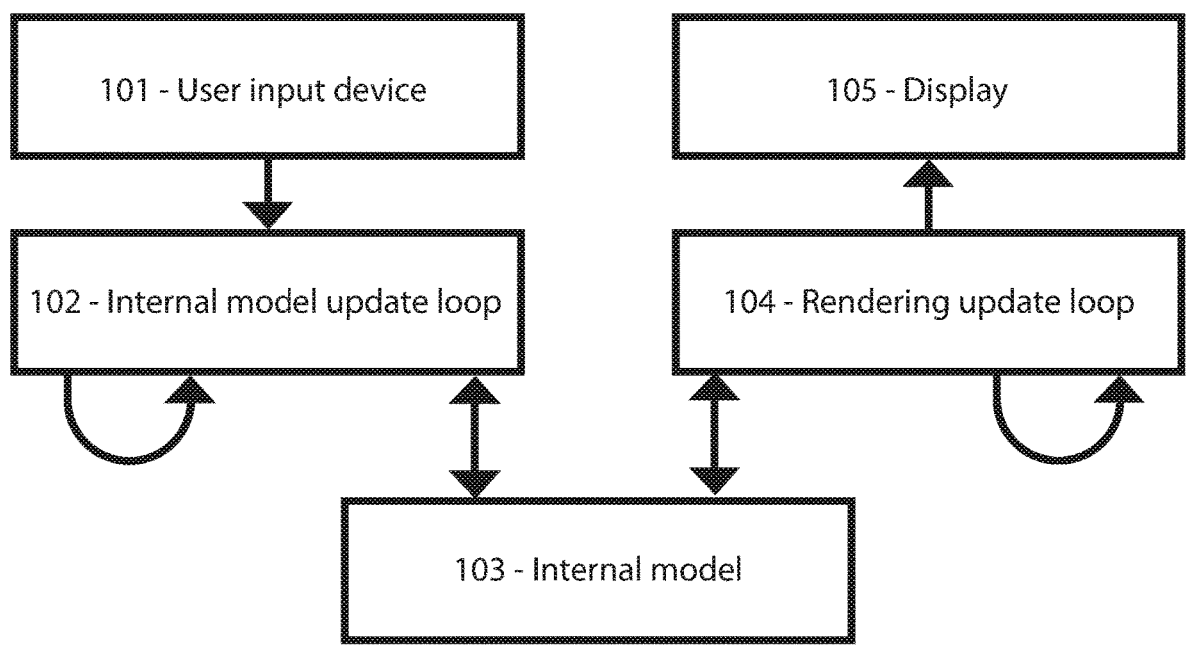
FIG. 1 illustrates a high-level block diagram for interacting with a 3D model.

Disclosed herein is a methodology that allows a user to "orbit" around a model on a specific axis of rotation and view an orthographic floor plan of the model. The present invention further allows a user to view and "walk through" the model while staying at a specific height above the ground with smooth transitions between orbiting, floor plan, and walking modes. Exemplary and non-limiting use cases include documentation of buildings for insurance, advertising of spaces online for real estate, and space modification for redecoration and remodeling. The foregoing use cases benefit from a mix of modes for navigating a space, including walking inside the space, orbiting the space from above, and viewing a floor plan of the space.

These methodologies may utilize computing hardware that is capable of processing and rendering 3D graphics, a display for showing the 3D model, and any number of input devices for receiving and processing user input. The computing hardware may contain special processing capability for 3D graphics such as a graphics processing unit (GPU).

A variety of input devices are envisioned, including buttons on a joystick or mouse, keys on a keyboard, or virtual touchscreen buttons. Such button inputs may be shown on a display and utilized to trigger a transition between target modes as will be described further herein. Various button inputs may also be used to move and/or rotate a camera. While described as buttons, such inputs may utilize any variety of icons or symbols such as arrows, increase/decrease (+/−) slide bars, and 'virtual hands.' Alternately, inputs that provide positional data such as a mouse, analog joystick, touchscreen, or gesture input devices and associated hardware and/or software may be used.

User input and information about the 3D model being displayed is used to update the position of a virtual camera used by a 3D rendering engine to render the 3D model. One of ordinary skill in the art will appreciate that various references to engines, modules, or executable software in general envision the embodiment of computer-readable instructions in a non-transitory computer readable storage medium. Those instructions may then be executed by a processor or array of processors in any variety of steps, series, or orders in an effort to implement the various functionalities, methodologies, and processes described herein. The foregoing is not meant to exclude—and, in fact, specifically includes—the possibility of application specific processors or dedicated computing hardware to perform certain steps or operations as may be appropriate in certain contexts or to enjoy certain efficiencies.

3D models may come in a variety of formats. Models may include one or more meshes of triangles, quads, and/or n-gons. 3D models may also include curved surfaces such as non-uniform rational basis splines (NURBS), which are a function of two parameters mapped to a common surface area in three-dimensional space. Models may also have associated color or material properties. For example, each vertex of a mesh may contain associated texture data in one or more separate images via UV mapping. Examples of common 3D model formats include ".obj", ".fbx", and ".dae."

3D models may contain metadata, some of which may be tied to specific sets of coordinates. This metadata may contain a name for the model, information about when, where, by whom, and with what hardware, the model was captured. The metadata may also contain annotations tied to specific locations, areas, or volumes on or around the model, as well as measurements of dimensions on or around the model.

A 3D model may be captured from a real-world location. The model dimensions may thus match the real-world dimensions of the location.

The 3D model may be locally stored in memory present on or coupled to the computing device. The 3D model may also be downloaded from a remote location by the modeling software in conjunction with a wired or wireless network connection and associated network hardware (e.g., wireless processor or Ethernet port). The software may allow the user to browse a list of 3D models available for viewing. The list may reflect models already downloaded and/or available for download. 3D models may also be streamed such that they may be loaded and rendered in part or at reduced resolution prior to the downloading of the full model.

FIG. 1 illustrates a high-level block diagram for interacting with a 3D model. Step 101 of FIG. 1 reflects the collection of user input. Step 102 of FIG. 1 reflects updating of an internal model (103). The user input from step 101 as well as information from internal model 103 may be used to update the internal model 103. Step 102 of FIG. 1 may run in a loop thereby continuously updating internal model 103 as well as processing any user input that may be received as a part of step 101.

Internal model 103, which may be stored locally in memory, in cloud storage, or downloaded from cloud storage in part of in whole, may include a variety of information. First, internal model 103 may include information about a virtual camera used as a viewpoint for rendering the 3D model. This may include the position, orientation, field of view, and type of perspective for the camera. It may also contain information that is used to update camera position, such as current velocity or rate of rotation, as well as the current mode of user interaction.

Rendering update loop (step 104) takes the information from internal model 103, including camera information, and generates a 3D rendering of the 3D object for display in step 105. A variety of 3D rendering engines for rendering 3D models are known in the art and may be implemented in the context of step 104.

Rendering update loop 104 may execute partially or entirely on a GPU. Update loop 104 may likewise execute in a massively parallel processing section of a heterogeneous processor architecture. The update loops of steps 102 and 104 may run on the computing device in an alternating or multithreaded manner, and access to internal model 103 may be locked to ensure that loops 102 and 104 are not interacting with internal model 103 at the same time.

In step 105, data is displayed on a display such as an LCD screen or OLED.

Figure 2:
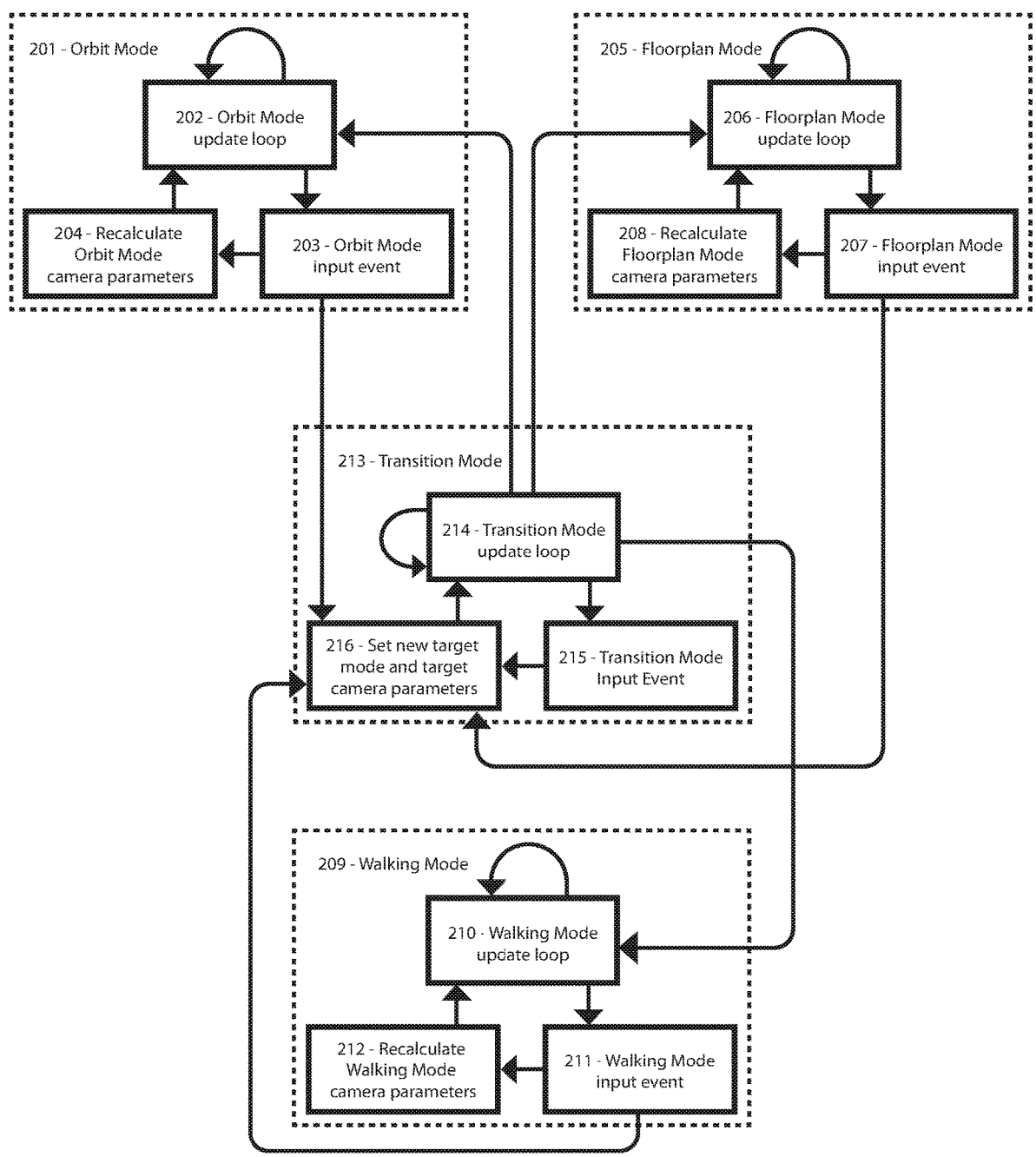
FIG. 2 illustrates a detailed workflow for certain processing steps that might take place in the context of FIG. 1.

FIG. 2 illustrates a detailed workflow for certain processing steps that might take place in the context of FIG. 1. More specifically, FIG. 2 illustrates in detail processing loops 102 and 104 of FIG. 1 with respect to their interactions with internal model 103. The internal model 103 may include one of four modes: orbit mode 201, floor plan mode 205, transition mode 213, and walking mode 209. Further modes are within the scope of the present invention. The update loops (202, 206, 210, 214) of the foregoing modes may, in some embodiments, be handled by a single loop with behavior that branches or otherwise differs depending on the mode. Other implementations are, however, possible and not meant to be limiting.

The update loops of orbit, floor plan, transition, and walking mode (202, 206, 214, and 210) may involve making changes to internal model 103 based on current parameters for camera movement. These changes may depend on the amount of time that has passed since the last iteration of the update loop. For example, if a camera parameter is changing at a specific rate, then the corresponding parameter value may be changed by the rate multiplied by the amount of time that has passed since the last iteration of the update loop.

These four update loops (202, 206, 210, and 214) may detect user input events (203, 207, 211, and 215, respectively), which may trigger a variety of actions. In some cases, the user input event for the corresponding mode or modes may lead to a new desired set of camera parameters such as position or orientation. These new camera parameters will, in turn, involve recalculating the corresponding internal model of camera parameters (204, 208, 212, 216). In other cases, the user input event may trigger a transition to a new target mode 216 as discussed in further detail below.

Orbit Mode

Multiple types of motion may be possible in orbit mode 201. The position of the camera may be pitched up or down, rotated left or right around a vertical axis, zoomed in or out, or panned horizontally. The pitch, rotation-around-a-vertical-axis, and zoom motions may be relative to a central point. The vertical axis of rotation may pass through the central point. In the case of pitch and rotation-around-a-vertical-axis, those motions maintain a constant distance to the central point. Thus, the pitch and rotation-around-a-vertical-axis motions of the camera may be thought of as vertical and horizontal travel, respectively, on the surface of a sphere centered on the central point. Zoom may be thought of as travel along the ray defined as passing through the camera to the central point.

The point on the 3D model with or without back-face culling or other ceiling removal techniques that is rendered in the center of the display may be used as the central point. Alternately, this central point may be defined by the point of a horizontal plane that is at the center of the display. This horizontal plane may be invisible, and its height may be defined by a global height of the floor of the 3D model. Alternately, a local floor height may be determined, and the intersection of the ray cast from the camera to the center of the display with the surface of the local floor height may be used to determine the central point.

The height of the floor of the 3D model may be determined via a variety of methods. For example, the points or faces of the model with normal vectors that are within a particular threshold angle of vertical pointing up may be assumed to be candidate floor locations. A global floor height could be calculated by determining the median of the heights of these candidate floor locations. Alternately, a local floor height could be computed by taking the average or median of floor heights over a specific area.

In an embodiment of orbit mode, the projection mode for the 3D rendering is perspective mode. The orientation of the camera may disallow rolling such that the view of the model is never tilted to one side. Limitations on these and other possible modes, orientations, and positions may be imposed. For example, pitch may be clamped such that it is impossible to go past 90 degrees down at the steepest or some angle above 0 degrees down at the shallowest. The zoom level may be clamped such that the closest zoom is a specified distance from the central point and the farthest zoom is such that the entire 3D model is visible.

Users may use either button-based input (e.g., keys) or position-based input (e.g., mouse or touchscreen) to move the camera relative to the model. These input events 203 may trigger a change in orbit mode camera parameters (204). A position-based user input controller may control the position of the camera along horizontal coordinates. For example, the X and Y coordinates of the user input controller may control the X and Y coordinates of a central point linked to the 3D model on the display. For reference, the X and Y coordinates of the model refer to the two horizontal dimensions and the Z coordinate refers to the vertical dimension.

The amounts of motion may be linked to provide the appearance of dragging the model. As a user moves their finger on a touchscreen or a mouse cursor over the model, the central point under the finger or cursor stays under the finger or cursor as the camera is being dragged relative to the model. The controller for this input may be, for example, dragging a single finger on a touchscreen, or left-clicking and dragging with a mouse.

Another position-based input may be used to control pitch and rotation-around-a-vertical-axis. For example, the X and Y coordinates of the user input controller may control the pitch and rotation-around-a-vertical-axis angles, respectively. Leftward motion may rotate the camera counter-clockwise around a vertical axis while upward motion may pitch the camera down. The controller for this input may be, for example, dragging two fingers on a touchscreen, or right-clicking and dragging with a mouse. In an alternate configuration, the rotation of the angle and change in the distance between two fingers in a multi-touch or gesture input may be used to control the rotation-around-a-vertical-axis and zoom of the camera, respectively. In a still further configuration, the position of the centroid of two fingers may be used to control the position of the camera along horizontal coordinates using the various methods described herein. Motion of a mouse scroll wheel may also be mapped to the zoom functionality. The vertical position of the centroid of a two- or three-finger multi-touch gesture may be used to control pitch.

Button-based controls may be used to directly control the various camera motions, including pitching, rotating around a vertical axis, and zooming, and horizontal movement over the surface of the model. For example, on a keyboard, the up and down arrow keys may pitch the camera down and up, respectively, while the left and right arrow keys will rotate the camera around a vertical axis clockwise and counter-clockwise, respectively. The "+" and "−" keys may zoom the camera closer to and further away from the model, respectively. The "W," "A," "S," and "D" keys or the up, left, down, and right arrow keys may move the camera forward, left, backward, and right along the horizontal plane, respectively. The foregoing key pairings are exemplary; alternative key pairing configurations are possible.

The detection of user input, as well as the updating of camera position and orientation based on current velocity and rate of rotation, may occur as part of update loop 202.

A user input event 203 may trigger recalculation of camera parameters 204 or a transition to another mode 216. Once camera parameters are recalculated 204, update loop 202 may update them as processor bandwidth allows or is otherwise allocated and scheduled.

Floor Plan Mode

In floor plan mode 205, the 3D model is viewed from above with the camera facing straight down at an approximately 90 degree angle. In one embodiment of floor plan mode, the projection mode for the 3D rendering is orthographic, thereby creating a floor plan-like appearance for the model.

The set of input controls and mappings in floor plan mode may be a subset of those for orbit mode. For example, the controls for floor plan mode may be identical to those described in the context of orbit mode with the exception that the pitch is clamped at 90 degrees downward. Rotation about a central point along a vertical axis is still possible as is zooming in and out toward and away from that point and moving the central point. The model may, however, only be viewed directly from above as a result of the clamping of pitch at 90 degrees. When the camera is pointing straight down in floor plane mode, the rotation of the camera relative to a vertical axis is a roll motion of the camera itself.

The zoom control in floor plan mode may be set differently from that of orbit mode. Since the camera projection may be orthographic, the area of model that is viewed may be changed when the user zooms in or out. Zooming in may decrease the area viewed while zooming out may increase the area viewed.

The detection of user input, as well as the updating of camera position and orientation based on current velocity and rate of rotation, may occur as part of floor plan mode update loop 205. A user input event 207 may trigger recalculation of camera parameters 208 or a transition to another mode 216. Once camera parameters are recalculated 208, update loop 206 may update those parameters in a manner similar to that of update loop 202 in orbit mode and as described above.

Walking Mode

In Walking Mode 209, users navigate the surface of the model with a navigation metaphor similar to the experience of walking on an exterior or interior surface of the model itself. In one embodiment, the camera stays at a fixed height above either the surface of the model or a locally or globally determined floor height by default. In another embodiment, the user in the virtual space of the 3D model may be defined as a particular volume. For example, the volume may be defined as a capsule shape with the axis of symmetry oriented along the Z axis. The camera may be designated to have a locale that is specific but nevertheless relative to the pre-defined volume. As a result, the position of the camera is determined by the interaction of the user volume with the 3D model. A downward gravity direction (and thus a definition of "up") may be defined as a vector pointing in the negative direction for the Z axis.

A collision checking mechanism may be implemented in some embodiments in order to prevent the camera or user volume from passing through the boundaries of the model. A physics engine may be used to allow the user volume to move in realistic ways through the 3D model. Multiple commercial and open-source 3D game engine packages provide this collision-checking and physics functionality off-the-shelf, including but not limited to the Unity Technologies Unity game engine, the Unreal Engine from Epic Games, Inc., and the CryENGINE® from CRYTEK. The physics engine, collision checking, and/or 3D game engine may run within, concurrently to, or in sequence with, update loop 210.

A "crouch" functionality may also be implemented thereby allowing the user to lower the height of the camera as well as possibly reduce the height of the user volume. A corresponding "jump" functionality may give the user a vertical velocity thereby propelling them upward. The physics engine may apply a negative vertical acceleration to pull the user back downward in a physically realistic manner as well as realistically handle the user walking off the edge of a surface.

Input events 211 may be used to trigger camera rotation, camera movement, jumping, crouching, a transition to a new mode, or other behaviors. The camera parameters may be recalculated using this input event 211 in step 212 of FIG. 2.

Users may use either button-based input such as keys or position-based input such as a mouse or touchscreen to move the camera around the model in walking mode. Position-based input may be used to allow the user to look around and rotate the camera while keeping the position of the camera constant. For example, the X and Y coordinates of the user input controller may control the rotation of the camera relative to a vertical axis passing through the camera and the pitch of the camera, respectively. Similarly, moving the user input controller up, down, left, or right may cause the camera to move up, down, left, or right, respectively.

This mapping may also be reversed such that moving the user input controller up, down, left, or right may cause the camera to move down, up, right, or left, respectively. In such a mapping configuration, the amounts of rotation may be matched to provide the appearance of dragging the model. As a user moves their finger on a touchscreen or a mouse cursor over the model, the point of the model under the finger or cursor may stay under the finger or cursor as the rotation of the camera is dragged relative to the model. Exemplary controllers for this input include dragging a single finger on a touchscreen, or left-clicking and dragging with a mouse.

Position-based input may also be used to move the camera around the 3D model. For example, the Y axis of the input controller may be mapped to forward/back motion and the X axis of the input controller may be mapped to rotation. Upward controller motion may move the camera forward along its central axis, while downward controller motion may move the camera backward along its central axis. Leftward controller motion may rotate the camera relative to a vertical axis passing through the camera to the left while rightward controller motion may rotate the camera along the same axis to the right. Alternately, the X axis of the input controller may be mapped to strafing motion such that leftward controller motion may move the camera to the left while rightward controller motion may move the camera to the right. The controller for this input may be, for example, dragging two fingers on a touchscreen, or right-clicking and dragging with a mouse.

Alternately, the model for moving through the space may be akin to dragging the model. As a user moves their finger on a touchscreen or a mouse cursor over the model, the point of the model under the finger or cursor stays under the finger or cursor as the position of the camera is dragged relative to the model as rotation is held constant.

Button-based controls may be used to directly control the various camera motions, including walking and rotation (pitching and rotation-around-a-vertical-axis). For example, on a keyboard, the up and down arrow keys may move the camera forward and back respectively; the left and right arrow keys may rotate the camera counterclockwise and clockwise around a vertical axis, respectively. The speed of movement may likewise be controllable by, for example, holding down a particular button to increase the rate of movement and rotation or holding down another particular button to decrease the rate of movement and rotation. Holding down the "shift" key and then pressing the up, down, left, or right arrow keys may pitch the camera up, pitch the camera down, rotate the camera clockwise around a vertical axis, and rotate the camera counterclockwise around a vertical axis, respectively. Crouch and jump functionality as previously discussed may be mapped to particular buttons. The scroll wheel of a mouse may be used as an alternate input for forward and backward camera motion.

The detection of user input, the updating of camera position and orientation based on current velocity and rate of rotation, as well as the general operation of a physics engine and a boundary collision checking system may all occur as part of walking mode update loop 210. A user input event 211 may trigger recalculation of camera parameters 212. Input even 211 may also effectuate a transition to another mode 216.

Transition Mode

Transition mode 213 provides a smooth visual transition from one mode to another. During this transition, the camera parameters for orientation and position, as well as other parameters in the internal model 103, are smoothly transitioned from their current initial values to a desired set of target values. The transition may take place over a specified time interval, which may vary depending on the total distance to be traveled during the transition such that longer transitions take more time.

Transitions may be triggered by the user. For example, the user may press a specific button to transition to a specific mode. For transitions from orbit mode or floor plan mode to walking mode, users may trigger a transition by zooming in past the maximum zoom-in level allowed in these modes. A brief delay may be introduced when maximum zoom-in is achieved prior to allowing further zoom-in inputs in order to prevent accidental mode transitions. For transitions from walking mode to orbit mode or floor plan mode, users may trigger a transition by using a button, positional, or gesture input linked to zooming out.

If a transition is triggered, a desired target mode as well as a desired target position and orientation for the camera will need to be determined (216). In a transition between orbit mode and floor plan mode, for example, the central point (as found using one of the methods described herein) at the center of the display may remain the central point in the target position and orientation of the camera. For the transition from orbit mode to floor plan mode, the target position of the camera may be set to be directly above the central point with pitch set to 90 degrees straight down. Since floor plan mode is preferentially rendered in orthographic mode, this transition may be handled by increasing the distance of the camera from the model toward a near-infinite distance while simultaneously narrowing its field of view such that the total portion of the 3D model that remains visible stays relatively constant. For the transition from floor plan mode to orbit mode, the target camera pitch may be either chosen from a preset value (e.g., 45 degrees downward) or chosen from the last pitch value from the last time the user was in orbit mode.

During transitions from either orbit mode or floor plan mode to walking mode, a desired position for the camera near the surface of the model is chosen; this position may be chosen be the user. The user may use a positional input device to touch the desired section of the model to which they desire to transition. A user may use a mouse cursor to double-click on the desired location or the user may use a touchscreen to tap the desired location. This location on the model may then be determined via ray casting. Alternately, the user may simply elect to change to walking mode without specifying a location. In such a case, the location will be automatically determined without further user intervention or interaction. The central point or the part of the 3D model at the center of the display may be used as this automatically determined location. The camera may then be placed at a specified height above this location. If a user volume is being used, the bottom of the user volume may be placed at the local floor height at that location.

The location on the 3D model chosen as the desired position may, in some instances, be inconvenient or impossible to use due to a collision between the 3D model and the user volume. Presence of an object or wall, or the lack of a floor in a particular area may similarly present a positioning difficulty or impossibility. In such a case, an algorithm for finding a viable nearby alternative location may be utilized. One such algorithm would attempt to place a user volume with its bottom at a local floor height at a range of points along a series of successively larger circles surrounding the initial desired position. The first location for which the user volume no longer collides with the 3D model or such collision can be fixed with a small motion may be chosen as the revised target position.

In an embodiment concerning the transition from orbit mode or floor plan mode to walking mode, the target heading (rotation around a vertical axis) of the camera is unchanged while the target pitch of the camera is set to a preset value such as 0. As a result, the target orientation of the user is looking toward the horizon.

For a transition from walking mode to orbit mode, a desired camera position and orientation may be chosen. One option is to return the camera position and orientation to a default "home" configuration. This "home" configuration may be chosen such that the entire 3D model is visible. Alternately, the target camera position and orientation may be chosen such that the camera is pointing down at the location on the 3D model that was directly below the camera prior to the transition and the target camera position is a preset distance from this location. This transformation may make the point on the 3D model under the camera (or the point at the base of the user volume) in walking mode the central point in orbit mode. The heading may be preserved while the pitch may be set either to a fixed value (e.g. 45 degrees down) or the value it had the last time the user was in orbit mode. This set of constraints defines a unique solution to be derived for target camera position and orientation.

For a transition from walking mode to floor plan mode, a desired camera position and orientation may be chosen. One option is to return the camera position and orientation to a default "home" configuration. This "home" configuration may be chosen such that the entire 3D model is visible. Alternately, the target camera position and orientation may be chosen such that it is pointing straight down and positioned directly above the position of the camera prior to the transition. This transformation may make the point on the 3D model under the camera (or the point at the base of the user volume) in walking mode the central point in floor plan mode. The heading may be preserved while the pitch is set to straight down.

Transitions may happen from one camera position in walking mode to a different camera position in walking mode. The user may do this via a particular input such as double-clicking on a mouse or track pad or by double-tapping on a touchscreen. The new location may be computed via a variety of methods. In one method, the part of the 3D model on the location on the screen tapped by the user may be used as a candidate target location for the base of the user volume. It may be impossible to move the user volume to this location. If the user selects, for example, a location on a wall, the user volume associated with the camera may collide with the model in this location. In this case, the methodologies described with respect to a viable location to transition to walking mode from orbit mode may be utilized.

Once a desired target mode and desired target camera parameters are determined, a path for transforming initial camera parameters (i.e., pre-transition parameters) to target parameters (i.e., post-transition parameters) may be computed. The parameters in the projection matrix of the camera may be directly transitioned from the initial projection matrix to the target projection matrix. Alternately, the orientation, position, field of view, and other camera parameters may be transitioned, and new projection matrices may be precalculated or calculated on the fly using these transitional parameters.

Multiple options exist for choosing how the parameters transform from initial values to target values. Linear interpolation is one option, but produces a sudden start and stop. In one embodiment, a formula for an "S" shaped transition is used to provide a smoothly accelerating and decelerating interpolation between two values. One example of such a function is:

$$f(x)=(1-\cos(pi*x))/2$$

for $0 \Leftarrow x \Leftarrow 1$

To interpolate parameter value x at time t between an initial parameter value $x_1$ at transition start time $t^1$ and a target parameter value $x_2$ at transition end time $t_2$, with "S" shaped transition function f(x) that transitions from 0 to 1 as x goes from 0 to 1, the program may compute it as:

$$x=x_1+(x_2-x_1)*f((t-t_1)/(t_2-t_1))$$

Updated parameter values may be calculated repeatedly by the transition mode update loop 214 during the specified transition time for all parameters that are transforming from their initial values to their desired target values.

Additional user input events 215 may trigger a new transition. For example, if a user triggers a transition to a specific mode during transition mode, a new target mode with attendant target camera parameters 216 may be determined, and a new transition may begin using the current mid-transition camera parameters as initial camera parameters. Otherwise, position and orientation may not be directly modifiable by the user during transition mode.

Once the target camera position and orientation are determined, the transition mode update loop changes the mode to the target mode (orbit, floor plan, or walking) and the transition period ends.

Input Control Mappings

In all modes (orbit, floor plan, walking, or transition) camera position or orientation may be modified with user input via a positional device such as a mouse, gesture input, or touchscreen. Multiple mapping options exist for the amount of input position change to the output change in the parameter. The mapping may, for example, be position-based whereby the amount of change in input position may directly correlate to the amount of change in the parameter. Alternately, the mapping may be nonlinearly position-based whereby the amount of change in input position raised to a power of greater than 1 may correspond to the amount of change in the parameter. Still further, the mapping may be velocity based whereby the amount of change in input position may set the rate of change in the parameter. Input motions may be damped and/or rate-limited to prevent overly rapid changes in parameters that may be visually jarring to the user. For example, a moving average of the input position over some time interval may be used as input, and the amount or rate of change from the input may be capped at a maximum value.

Rendering

In an embodiment of orbit, floor plan, and transition mode, the rendering process may be modified to allow users to view the inside of the 3D model from a viewpoint outside the 3D model, which may be useful if the model is of an interior space that has a ceiling. Such rendering allows the user to view the interior without the ceiling interfering with model viewing. This may be accomplished by turning on back-face culling in the rendering pipeline.

Alternately, the model may be clipped at a specified height above the floor of the 3D model such that parts of the model above this height are invisible. In another method, the 3D model may be segmented into ceiling areas and non-ceiling areas. Automatic segmentation of the ceiling may be accomplished by first segmenting the walls using, for example, plane detection techniques to detect walls, identifying walls via their vertical orientation and size, and then separating out any parts of the model that are attached to the top of the walls.

In an embodiment of walking mode, the model is not back-face culled nor is it otherwise modified to remove the ceiling. A switch from removing ceilings to not removing ceilings or vice versa may be made at a specified point in the transition during transition mode immediately upon entering or leaving walking mode.

Models may contain multiple floors. For example, the model may be of a multistory building. Viewing lower floors of a multistory model may be difficult in orbit or floor plan modes. The model may be segmented into multiple floors. The user may do this manually by selecting one or more planes to bisect the model by dragging them into the correct location with a vertical motion.

Alternately, multiple floors may be automatically detected via a variety of techniques. For example, candidate floor locations may be identified in the 3D model via the detection of near-vertical upward normal vectors. Then, a floor-dividing plane or surface may then be added slightly below each detected floor height for which there is more than a threshold amount of floor within a specific height interval. Once floor-dividing planes or surfaces are added for each floor, then the user may select a candidate plane or surface above which everything in the 3D model should be hidden in orbit or floor plan mode. These floor selections may be listed as buttons on the display.

Measurement

The method of interacting with the 3D model described herein may allow users to measure dimensions on the model. Users may select start and end locations for the measurement on the model. The computing device may then automatically compute the distance between those two points and display it on the display along with a line between measurement endpoints or other visual representation of the measurement.

The user may select the start and end locations for the measurement using a positional input device such as a mouse, track pad, or touchscreen. In an embodiment, the user first activates a measurement mode using a button press or other input or indicia of choice. The user next uses the positional input device to select a start location for the measurement. The user finally uses the positional input device to select an end location for the measurement. If the user is using a mouse or track pad, the start and end locations may be selected with a click of the mouse button. If the user is using a touchscreen, these locations may be selected by the final position of a touch event. In the event that the user is using a touchscreen, the location of the measurement may be placed slightly above the location of the touch event on the screen and marked on the display with a marker such as a crosshairs. This allows precise placement of measurement points to be made without the points being hidden under the finger of the user. Once the measurement is complete, measurement mode may be automatically deactivated, allowing for normal interaction.

The measurement may be displayed as a line from the measurement start point to the measurement end point. The thickness of the line may taper down to a point at both ends, allowing the precise start and end points to be more clearly viewed. For example, the line may be rendered as three segments—a rectangle along the middle of the line, and a pair of triangles at the endpoints that abut the two short ends of the rectangle.

The distance covered by a measurement may be displayed as text superimposed on the line of the measurement. This text may have a semi-transparent or opaque background surrounding it. As a result, the text may be observed more readily by causing it to be superimposed on the line and 3D model.

A circle or other shape rendered on or near the surface of the 3D model at each endpoint may be rendered during and/or after the measurement process. This may allow users to more precisely place measurements on edges or corners. 3D measurements may be bill-boarded or dynamically oriented so that the lines or polygons making up the measurement line always face the camera.

3D measurements may be rendered in such a way as to ensure that occlusions with the model are clear. For example, each 3D measurement may be rendered as two objects: a first object that is partially transparent and is rendered in front of the 3D model and a second object that is more opaque and is rendered at or near the correct depth thereby allowing closer parts of the 3D model to occlude some or all of the second object.

Alternately, the measurement may be rendered solely at or near the correct depth. The depth of the measurement line may be dynamically moved toward the camera by a small distance with the new endpoint locations possibly staying on the rays from the camera to the true endpoint locations. Such movement may reduce situations in which a bumpy surface partially occludes a measurement line drawn on that surface.

Measurement distances and displayed distance text may update in a continuous fashion as the second endpoint is being placed or an endpoint is being moved. If a user moves an endpoint over a display location for which there is no intersection with a 3D model, the distance text may disappear. The placement of an endpoint at this location may therefore be disabled A displayed measurement may be selectable by the user, for example, by tapping on the line itself or the measurement text with a positional input device. Once a measurement is selected, additional options may appear on the measurement.

For example, a small button may appear on the display near the measurement text allowing the measurement to be deleted. Additionally, buttons at the ends of the measurement line may appear on the display, thereby allowing measurement endpoints to be moved. The movement of endpoints may be accomplished via a click-and-drag motion on a mouse or trackpad, a drag gesture on a touchscreen, or other techniques.

The location on the 3D model for the measurement endpoints may be established via a variety of methods. One such method is raycasting along the vector defined by the camera parameters and the screen coordinates of the desired endpoint. The first intersection with the model may then be identified. Another such method is examining the Z buffer from the rendering to determine the distance to the model at the screen coordinates of the desired endpoint and then projecting from the camera position and orientation to determine the location of this point in three dimensions.

The surface of the 3D model may be analyzed for flat surfaces, edges, and/or corners. Plane detection methods such as the 3D Hough Transform may be used to find the location and orientation of planes in the 3D model. Edges may be determined by a variety of methods. In one method, the faces of the 3D model are segmented into groups that are within a specified distance of a detected plane. The edges of these groups may be defined to be edges of the 3D model. Additionally, edges may be defined as the segments of lines formed by intersections of two detected planes in the 3D model for which there are 3D model faces within a specified distance. Edges of the 3D model may additionally be found by looking for depth differences or ratios between adjacent pixels in the Z buffer of the rendered 3D model that are above a specific amount. Corners may likewise be found by a variety of methods, including the points defined by the intersections of three detected planes in the 3D model.

During the user-guided process of endpoint placement or movement, the interface may snap measurement endpoints to the nearest edge or corner if such an edge or corner is within a specified distance of the current candidate endpoint location with respect to either screen coordinates or 3D world coordinates. The threshold distance for snapping to a corner may be larger than the threshold distance for snapping to an edge.

An additional measurement mode that allows for plane-to-plane or plane-to-point measurements may be available. In this mode, when a user selects a point on the 3D model that is part of a detected plane as a measurement endpoint, the measurement is constrained to the axis of the normal vector of the plane associated with that point.

Measurement may be handled differently in floor plan mode when users desire to make two-dimensional measurements on a horizontal plane. The interface for making measurements in two-dimensions may be similar to the 3D measurement interfaces described herein. The two-dimensional measurement endpoints may, however, be determined by ray casting from the screen location to the horizontal plane or directly mapping the screen coordinates of the endpoints to the world coordinates of the viewed area.

Two-dimensional measurements may also be displayed differently. For example, measurements may be displayed in a "dimension" style with short lines centered at the endpoints that are perpendicular to the line of the measurement. These two-dimensional measurements may be drawn on top of the 3D model such that they are not occluded by the model. In the case of multi-floor models, two-dimensional measurements may be associated with a specific floor. In a particular type of measurement mode, two-dimensional measurements may be snapped to walls or corners, or constrained to be perpendicular to the planes defined by walls using, for example, the plane detection and snapping methods described herein.

When in floor plan mode, 3D measurements made in other modes may be either hidden or visually distinguished from horizontal two-dimensional measurements. For example, such measurements may be distinguished using a different color of line. When in orbit mode or walking mode, horizontal two-dimensional measurements may be hidden, or they may be displayed at a height that is at or a near a local or global floor height.

Annotation

The methods of interacting with the 3D model described herein may allow users to make annotations on the model. To create an annotation, users may first enter annotation mode by pressing an on-screen button or offering other input. Users may then select a location on the 3D model for an annotation using an interface similar to the interface for placing a measurement start point. Users may then type a text string associated with the annotation, or add images or videos (e.g., via drag-and-drop operation) to the annotation. Once the metadata entry is complete, the users may then offer input indicative of finalizing the annotation.

Annotations may be selected, moved, and deleted using interface methods similar to the ones described herein for measurement. Annotation locations may operate in a manner similar to a measurement endpoint. The display area of the annotation data may operate in a manner similar to the measurement text with regard to selection, deletion, and other user operations. Annotation data, 3D measurement data, and two dimensional measurement data may be stored as part of the metadata associated with the 3D model. Thus, measurements and annotations created during a user session may be saved, and measurements and annotations created during prior sessions may be loaded.

Figure 3:
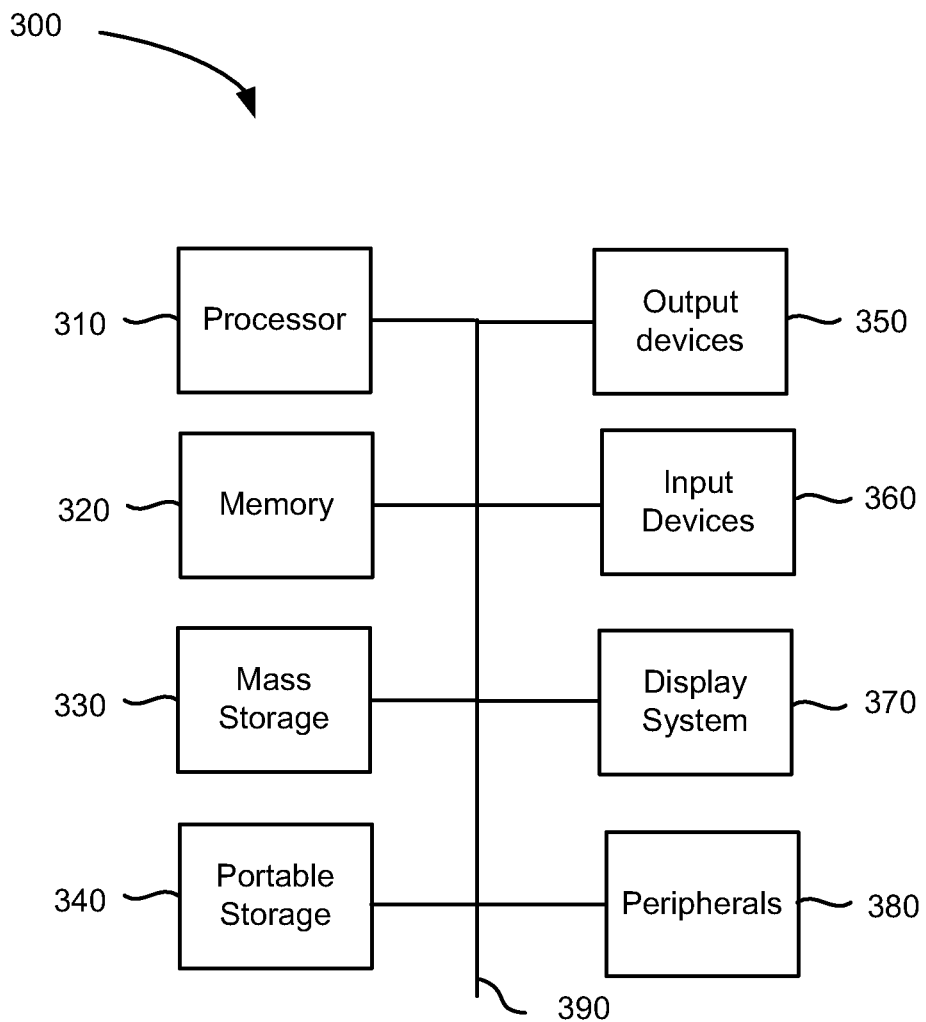
FIG. 3 illustrates an exemplary computing device for implementing the 3D modeling interactions disclosed herein.

FIG. 3 illustrates an exemplary computing device 300 for implementing the 3D modeling interactions disclosed herein. The computing device 300 of FIG. 3 includes one or more processors 310 and memory 320. Main memory 320 stores, in part, instructions and data for execution by processor 310. Main memory 320 can store the executable instructions when in operation. Computing device 300 as shown in FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. The components may, however, be connected through one or more data transport means. For example, processor unit 310 and main memory 320 may be connected via a local microprocessor bus, and the mass storage device 330, peripheral device(s) 380, portable storage device 340, and display system 370 may be connected via one or more input/output (I/O) buses.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 320.

Portable storage device 340 operates in conjunction with a portable non-volatile storage medium to input and output data and computer-readable instructions to and from the computer system 300 of FIG. 3. The computer-readable instructions for implementing embodiments of the present invention may be stored on such a portable medium and input to the computer system 300 via the portable storage device 340 or received by way of a network connection such as those that may be implemented by way of peripherals 380.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Input devices 360 are also inclusive of network interfaces, which may also operate as an output interface (e.g., an Ethernet connection). Additionally, the system 300 as shown in FIG. 3 includes output devices 350. Examples of suitable output devices include speakers, printers, network interfaces, and monitors.

Display system 370 may include a liquid crystal display (LCD) or other suitable display device. Display system 370 receives textual and graphical information, and processes the information for output to the display device. In some instances, the display system 370 may also offer input and output (e.g., a touchscreen or 'soft keys'). Peripherals 380 may include any type of computer support device to add additional functionality to the computer system. For example, peripheral device(s) 380 may include a modem or a router or other device offering wireless connectivity. Other peripherals might include additional storage devices or image capture devices.

The components illustrated in FIG. 3 are those typically found in computer systems that may be suitable for use with embodiments of the present invention. The components of FIG. 3 are intended to represent a broad category of such computer components that are well known in the art. The computer system illustrated by way of FIG. 3 may thus be representative of a personal computer, hand held computing device, mobile computing device including any variety of smartphone, tablet computing devices, workstations, servers, as well as any other computing device that might be selected to implement embodiments of the present invention. The computer can also include different bus configurations, networked platforms, multi-processor platforms and implement any variety of suitable operating systems.

The foregoing detailed description has been presented for purposes of illustration and description. It is not intended to be exhaustive or limiting. Modifications and variations are possible in light of the foregoing. The described embodiments sufficiently explain the principles of the technology and its practical application to thereby enable others skilled in the art to best utilize the invention with various modifications. Any limitations as to the present invention are to be defined solely by the scope of the claims appended hereto.

What is claimed is:

1. A system, comprising:
a processor; and
a memory communicatively coupled to the processor, the memory having stored therein computer-executable instructions, the memory comprising:
an interface component configured to:
generate a graphical user interface that facilitates viewing and navigating a three-dimensional model from different perspectives of a virtual camera in different navigation modes;
receive user input indicating a target position of the virtual camera in one of the navigation modes; and
in response to a determination that a transition from a current position to the target position of the virtual camera collides with the three-dimensional model:

select a first position as a new target position such that another transition from the current position to the first position does not collide with the three-dimensional model, the selecting the first position including placing a series of successively larger concentric circles surrounding the current position, the first position representing a first circle of the series of successively larger concentric circles surrounding the current position in which the first position no longer collides with the three-dimensional model; and
generate at least one representation of the three-dimensional model in the graphical user interface from at least one of the different perspectives based on the new target position.

2. The system of claim 1, wherein the determination that the transition from the current position to the target position of the virtual camera collides with the three-dimensional model comprises determining that the target position collides with an object within the three-dimensional model.

3. The system of claim 1, wherein the determination that the transition from the current position to the target position of the virtual camera collides with the three-dimensional model comprises determining that the target position collides with a wall within the three-dimensional model.

4. The system of claim 1, wherein the different navigation modes comprise a walking mode.

5. The system of claim 1, wherein the different navigation modes comprise an orbit mode.

6. The system of claim 1, wherein the different navigation modes comprise a floor plan mode.

7. The system of claim 1, wherein the different navigation modes comprise a transition mode.

8. A method, comprising:
generating, by a system comprising a processor, a graphical user interface that facilitates viewing and navigating a three-dimensional model from different perspectives of a virtual camera in different navigation modes;
receiving, by the system, user input indicating a target position of the virtual camera in one of the navigation modes; and
in response to a determination that a transition from a current position to the target position of the virtual camera collides with the three-dimensional model:
selecting, by the system, a first position as a new target position such that another transition from the current position to the first position does not collide with the three-dimensional model, the selecting including placing a series of successively larger concentric circles surrounding the current position, the first position representing a first circle of the series of successively larger concentric circles surrounding the current position in which the first position no longer collides with the three-dimensional model; and
generating, by the system, at least one representation of the three-dimensional model in the graphical user interface from at least one of the different perspectives based on the new target position.

9. The method of claim 8, wherein the determination that the transition from the current position to the target position of the virtual camera collides with the three-dimensional model comprises determining that the target position collides with an object within the three-dimensional model.

10. The method of claim 8, wherein the determination that the transition from the current position to the target position of the virtual camera collides with the three-dimensional model comprises determining that the target position collides with a wall within the three-dimensional model.

11. The method of claim 8, wherein the different navigation modes comprise a walking mode.

12. The method of claim 8, wherein the different navigation modes comprise an orbit mode.

13. The method of claim 8, wherein the different navigation modes comprise a floor plan mode.

14. The method of claim 8, wherein the different navigation modes comprise a transition mode.

15. A non-transitory computer-readable medium having instructions stored thereon that, in response to execution, cause a system including a processor to perform operations, comprising:

generating a graphical user interface that facilitates viewing and navigating a three-dimensional model from different perspectives of a virtual camera in different navigation modes;

receiving user input indicating a target position of the virtual camera in one of the navigation modes; and in response to a determination that a transition from a current position to the target position of the virtual camera collides with the three-dimensional model:

selecting a first position as a new target position such that another transition from the current position to the first position does not collide with the three-dimensional model, the selecting including placing a series of successively larger concentric circles surrounding the current position, the first position representing a first circle of the series of successively larger circles surrounding the current position in which the first position no longer collides with the three-dimensional model; and generating at least one representation of the three dimensional model in the graphical user interface from at least one of the different perspectives based on the new target position.

16. The non-transitory computer-readable medium of claim 15, wherein the determination that the transition from the current position to the target position of the virtual camera collides with the three-dimensional model comprises determining that the target position collides with an object within the three-dimensional model.

17. The non-transitory computer-readable medium of claim 15, wherein the determination that the transition from the current position to the target position of the virtual camera collides with the three-dimensional model comprises determining that the target position collides with a wall within the three-dimensional model.

18. The non-transitory computer-readable medium of claim 15, wherein the different navigation modes comprise a walking mode.

19. The non-transitory computer-readable medium of claim 15, wherein the different navigation modes comprise an orbit mode.

20. The non-transitory computer-readable medium of claim 15, wherein the different navigation modes comprise a transition mode.

\* \* \* \* \*